(12) United States Patent
Kuo

(10) Patent No.: US 7,292,823 B2
(45) Date of Patent: Nov. 6, 2007

(54) BLUETOOTH HEADSET IN-CAR HOLDER/CAR KIT

(76) Inventor: Charles Kuo, 11F-5, No. 895, Sec. 4, Pa The Rd., Nan-King Dist., Taipei City (TW)

( * ) Notice: Subject to any disclaimer, the term of this patent is extended or adjusted under 35 U.S.C. 154(b) by 406 days.

(21) Appl. No.: 11/099,565

(22) Filed: Apr. 6, 2005

(65) Prior Publication Data

US 2006/0019718 A1 Jan. 26, 2006

(30) Foreign Application Priority Data

Jul. 8, 2004 (TW) .............................. 93210767 U

(51) Int. Cl.
*H04B 7/00* (2006.01)
(52) U.S. Cl. ............... 455/41.2; 455/575.1; 455/575.6; 455/575.9; 379/330; 379/431
(58) Field of Classification Search ............ 455/41.2, 455/575.1, 575.2, 575.6, 575.9, 90.3, 128, 455/347, 573, 569.1; 379/330, 431, 447
See application file for complete search history.

(56) References Cited

U.S. PATENT DOCUMENTS

| 4,293,761 | A | * | 10/1981 | Pramaggiore | ................ 219/269 |
| 4,650,962 | A | * | 3/1987 | Pramaggiore | ................ 219/264 |
| 5,829,993 | A | * | 11/1998 | Wu | ............................ 439/131 |
| 6,134,456 | A | * | 10/2000 | Chen | ......................... 455/569.2 |
| 6,477,391 | B1 | * | 11/2002 | Muramatsu et al. | ...... 455/550.1 |
| 6,512,826 | B1 | * | 1/2003 | Kim | ........................ 379/420.04 |
| 6,641,405 | B2 | * | 11/2003 | Chou | ........................... 439/32 |
| 6,944,294 | B2 | * | 9/2005 | Tsay | ............................ 379/446 |
| 2002/0086716 | A1 | * | 7/2002 | Pan | ............................. 455/569 |
| 2002/0187816 | A1 | * | 12/2002 | Ou | .............................. 455/569 |
| 2004/0204163 | A1 | * | 10/2004 | Ou | ........................... 455/569.1 |
| 2005/0059344 | A1 | * | 3/2005 | Chang | |
| 2006/0190169 | A1 | * | 8/2006 | Kawai | ......................... 701/211 |

\* cited by examiner

*Primary Examiner*—Matthew Anderson
*Assistant Examiner*—Minh Dao
(74) *Attorney, Agent, or Firm*—Birch, Stewart, Kolasch & Birch, LLP

(57) ABSTRACT

A Bluetooth headset in-car holder/car kit has a main body having an end formed into a pivoted plug for plugging in a cigarette lighter on a vehicle to obtain a power supply, and another end into a holding seat for a wireless Bluetooth headset to seat therein. The holding seat is provided with at least one connecting port, such as a USB port, to electrically connect to the Bluetooth headset and the plug, so that power is supplied from the vehicle via the plug to charge the Bluetooth headset. The main body is provided with speaker and microphone electrically connected to the connecting port, so that the headset in-car holder car kit with the wireless Bluetooth headset seated therein forms an in-car Bluetooth handsfree kit, enabling a user to listen and speak via the speaker and the microphone on the main body without putting on the Bluetooth headset.

4 Claims, 6 Drawing Sheets

BLUETOOTH HEADSET IN-CAR HOLDER/CAR KIT

FIELD OF THE INVENTION

The present invention relates to a Bluetooth headset in-car holder/car kit and more particularly to an in-car holder/car kit that together with a wireless Bluetooth headset seated therein forms a Bluetooth handsfree apparatus for use on a vehicle.

BACKGROUND OF THE INVENTION

A Bluetooth headset is an apparatus for wireless communication within a short distance from ten to one hundred meters without being limited to any transmission direction or interrupted by any obstacle.

When a driver puts the wireless Bluetooth headset on one ear during driving, the ear with the Bluetooth headset would usually become very uncomfortable after a prolonged time. It is therefore desirable to develop a Bluetooth handsfree apparatus for use on a vehicle, so that a user may be comfortably on a mobile phone without the need of holding the phone or putting on the wireless Bluetooth headset. Currently, a consumer has to separately purchase a Bluetooth headset and an in-car Bluetooth handsfree apparatus at a doubled expense. It is therefore tried by the inventor to develop a versatile in-car handsfree apparatus that enables a consumer to purchase only the Bluetooth apparatus to enjoy the convenience of Bluetooth headset and the in-car Bluetooth handsfree apparatus.

SUMMARY OF THE INVENTION

A primary object of the present invention is to provide a Bluetooth headset in-car holder/car kit, which together with a wireless Bluetooth headset seated therein forms a Bluetooth handsfree apparatus for use on a vehicle.

To achieve the above object, the Bluetooth headset in-car holder/car kit according to the present invention has a main body having an end formed into a pivoted plug for plugging in a cigarette lighter on a vehicle to obtain a power supply, and another end into a holding seat for a wireless Bluetooth headset to seat therein. The holding seat is provided with at least one connecting port, such as a USB port, to electrically connect to the Bluetooth headset and the plug, so that power is supplied from the vehicle via the plug to charge the Bluetooth headset seated in the holding seat. The main body is also provided with speaker and microphone electrically connected to the connecting port, so that the in-car holder/car kit with the wireless Bluetooth headset seated therein forms a complete in-car Bluetooth handsfree apparatus, enabling a user to listen and talk on a mobile phone via the speaker and the microphone on the Bluetooth headset in-car holder/car kit without the need of putting on the Bluetooth headset.

Another object of the present invention is to provide a Bluetooth headset in-car holder/car kit that also serves as a charging stand for charging a wireless Bluetooth headset seated therein, so that a user need not to separately purchase a charger for charging the Bluetooth headset.

When a wireless Bluetooth headset is seated in the Bluetooth headset in-car holder/car kit of the present invention, power is supplied from the vehicle via the plug of the main body plugged in the cigarette lighter of the vehicle to charge the Bluetooth headset.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
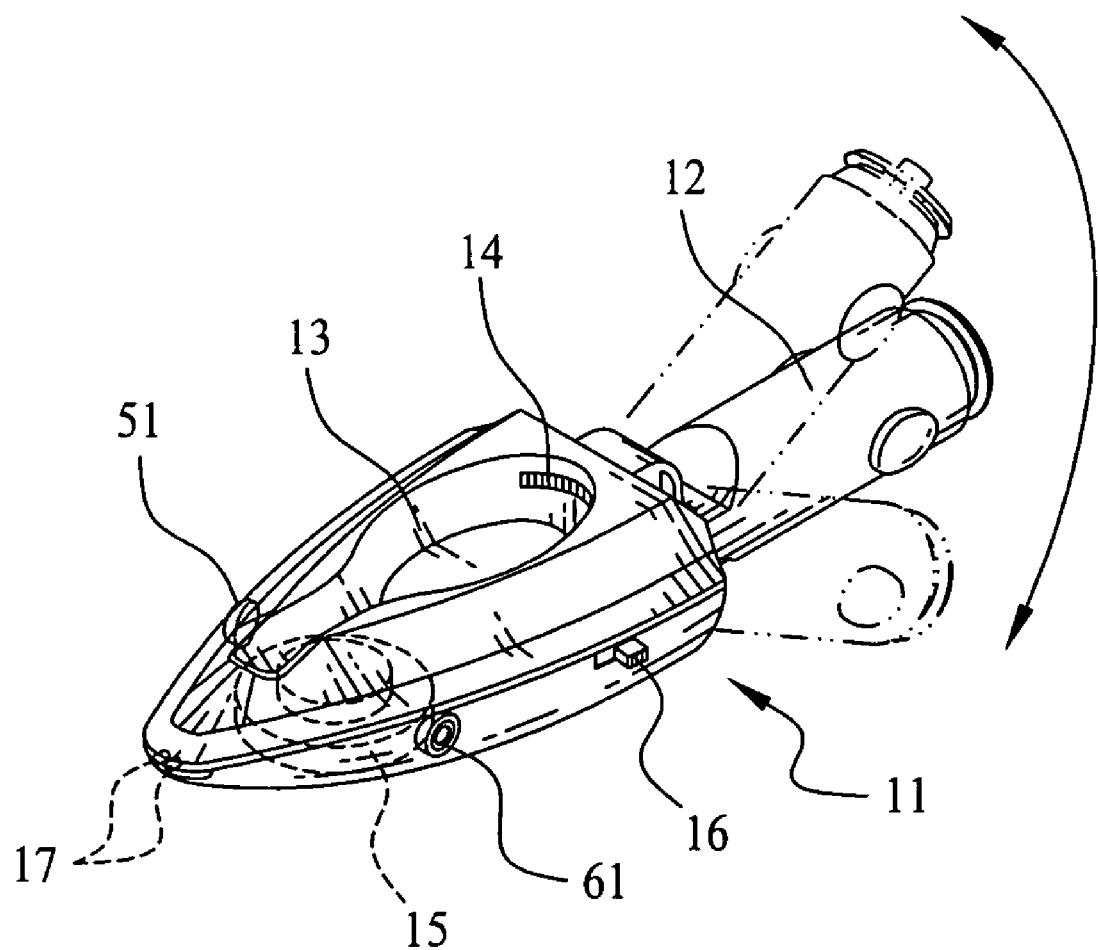
FIG. 1 is a perspective view of a Bluetooth headset in-car holder/car kit.
Figure 4:
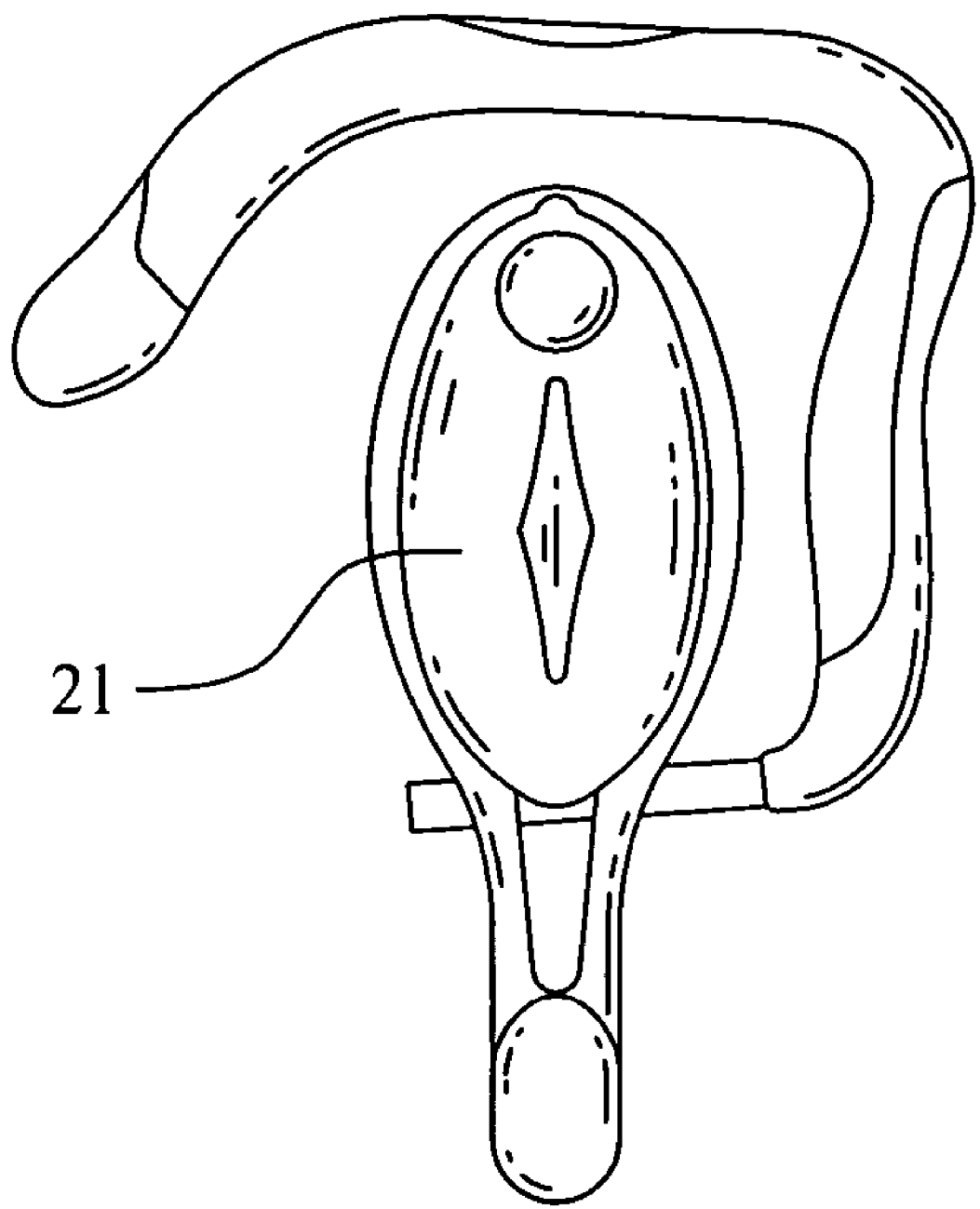
FIG. 4 shows a wireless Bluetooth headset separated from the Bluetooth headset in-car holder/car kit of the present invention for use alone.

Please refer to FIG. 1 that is a perspective view of a Bluetooth headset in-car holder/car kit according to an embodiment of the present invention. As shown, the Bluetooth headset in-car holder/car kit includes a main body 11, which is provided at an end with a pivoted plug 12 for connecting to a cigarette lighter socket 31 on a vehicle, and at an opposite end with a holding seat 13 for a wireless Bluetooth headset 21 to seat therein (see FIGS. 2 and 4). The holding seat 13 is provided with at least one connecting port 14, such as a universal serial bus (USB) port, for electrically connecting with the Bluetooth headset 21 seated in the holding seat 13. The connecting port 14 is also electrically connected with the plug 12, so that a power supply of the vehicle could be supplied to the main body 11 of the Bluetooth car kit and to charge the Bluetooth headset 21 seated in the holding seat 13 when the plug 12 is plugged in the cigarette lighter socket 31 on the vehicle. A speaker 15 is internally provided in the main body 11 to electrically connect to the connecting port 14.

With the above arrangements, the wireless Bluetooth headset 21 seated in the holding seat 13 of the Bluetooth headset in-car holder/car kit is electrically connected to the speaker 15, allowing sounds, including voices and music, received via the Bluetooth headset 21 to be output via the speaker 15. Therefore, the Bluetooth headset in-car holder/car kit of the present invention with a Bluetooth headset seated therein forms an in-car Bluetooth handsfree kit, which enables a user to listen and talk on the road without the need of putting on the Bluetooth headset 21.

Figure 3:
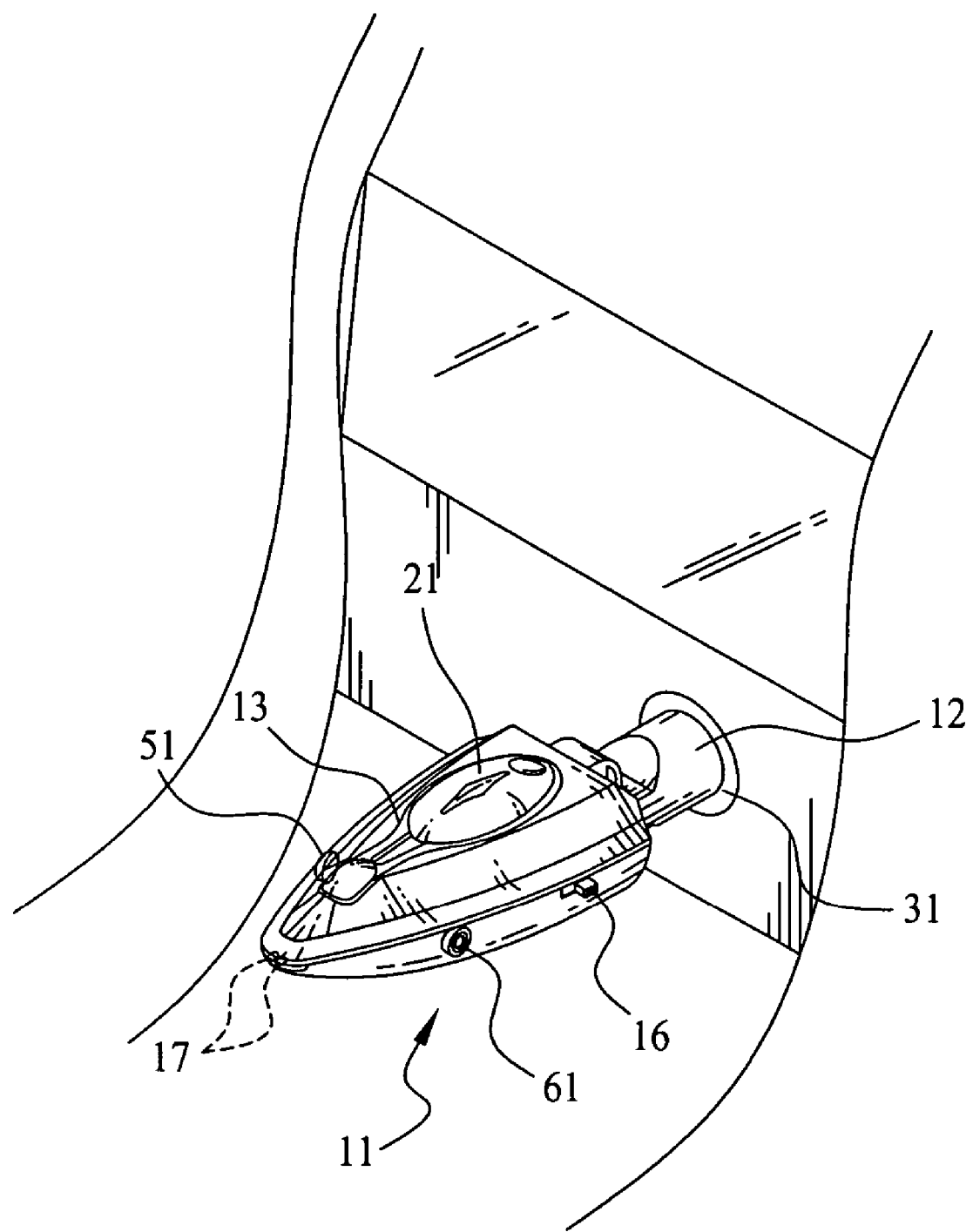
FIG. 3 shows the Bluetooth headset in-car holder/car kit lot of the present invention in use.

Please refer to FIG. 3. When the wireless Bluetooth headset 21 is seated in the holding seat 13 on the main body 11 of the Bluetooth headset in-car holder/car kit of the present invention, a user may then connect the plug 12 at one end of the main body 11 to the cigarette lighter socket 31 on the vehicle. At this point, a power supply of the vehicle automatically charges the wireless Bluetooth headset 21. That is, the Bluetooth headset in-car holder/car kit of the present invention also serves as an in-car charging stand for the wireless Bluetooth headset 21; and a user need not spend additional money to separately buy any other wireless Bluetooth headset charging stand.

In an embodiment of the present invention, the Bluetooth headset in-car holder/car kit is internally provided with a microphone.

Figure 5:
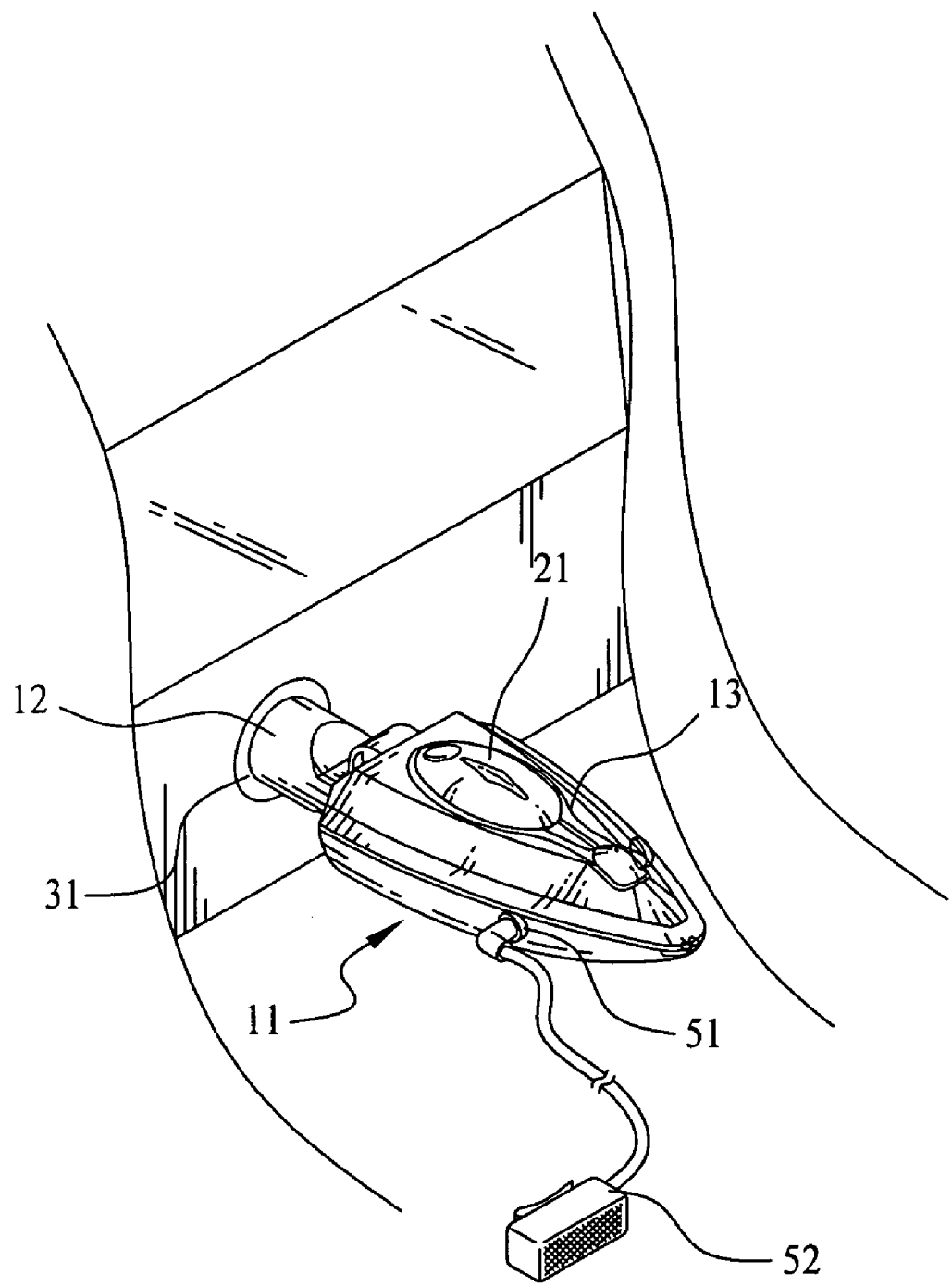
FIG. 5 is another view showing the Bluetooth headset in-car holder/car kit of the present invention in use.

Please refer to FIG. 5. The main body 11 of the Bluetooth car kit of the present invention may be provided with a microphone jack 51 for an external microphone to connect thereto. A microphone extension line 52 may be connected to the microphone jack 51 for a user using the Bluetooth car kit in the car to speak privately to a person at the other end of the phone line.

Figure 6:
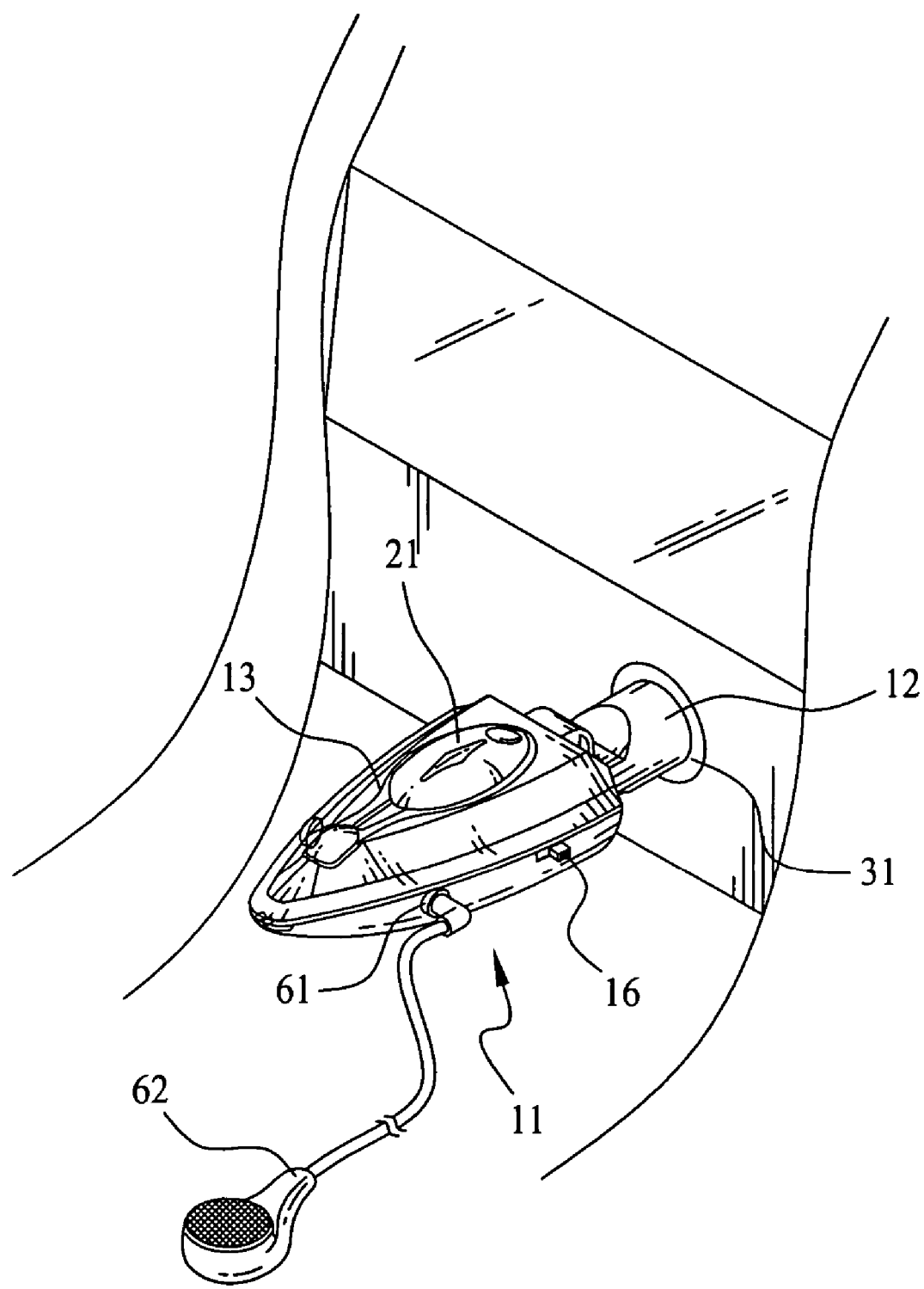
FIG. 6 is still another view showing the Bluetooth headset in-car holder/car kit of the present invention in use.

Please refer to FIG. 6. The main body 11 of the Bluetooth car kit of the present invention may be provided with an earphone jack 61 for an external earphone to connect thereto. An earphone extension line 62 may be connected to the earphone jack 61 for a user using the Bluetooth car kit in the car to speak privately to a person at the other end of the phone line without being heard by others.

In another embodiment of the present invention, the Bluetooth headset in-car holder/car kit is externally provided at the main body 11 with a microphone (not shown in the illustrated drawings). When the wireless Bluetooth headset 21 is seated in the holding seat 13, the microphone and the speaker 15 on the Bluetooth car kit of the present invention replace microphone and speaker on the wireless Bluetooth headset 21, so that sounds received via the wireless Bluetooth headset 21 are output via the speaker 15, and the user could talk on the road via the microphone on the main body, just as using a complete in-car Bluetooth handsfree kit.

The Bluetooth headset 21 may be used independently when it is removed from the holding seat 13. However, the main body is not designed for use alone.

Figure 2:
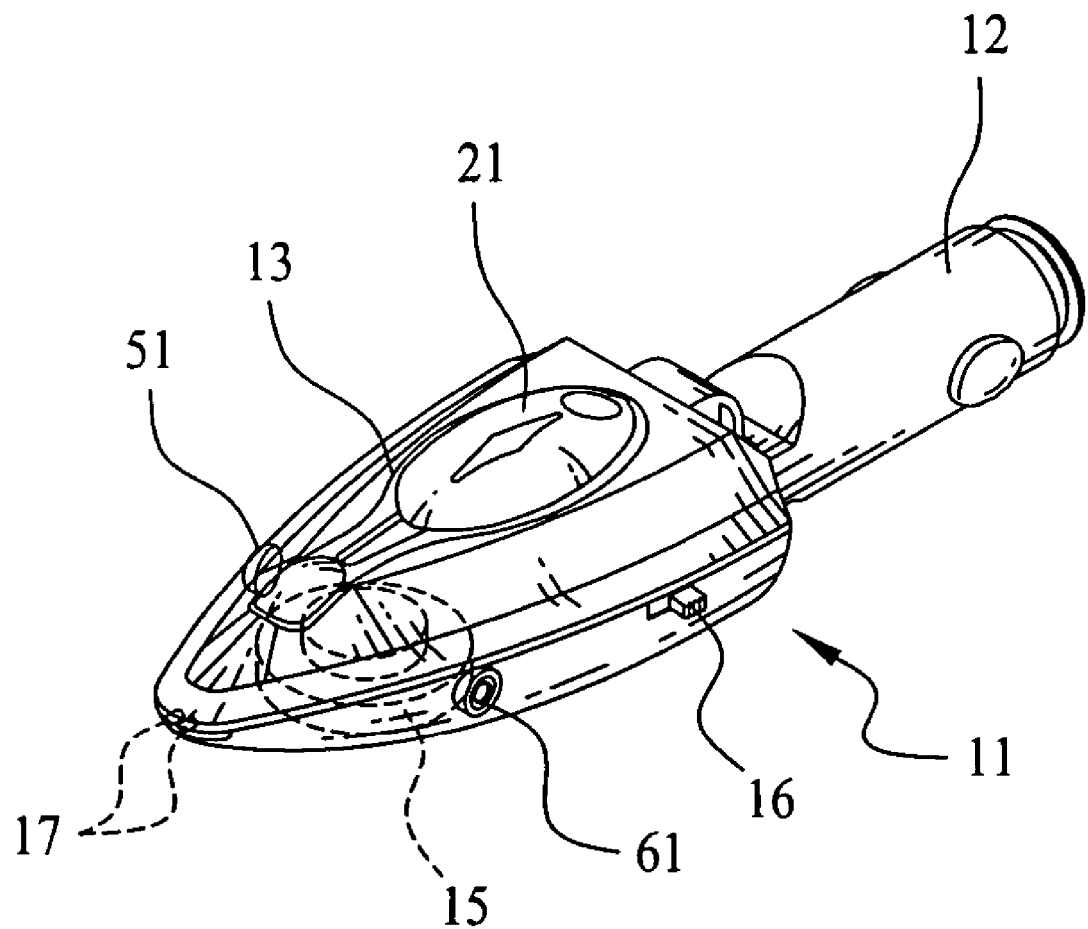
FIG. 2 shows the Bluetooth headset in-car holder/car kit of FIG. 1 with a wireless Bluetooth headset seated therein.

Please refer to FIGS. 1, 2, and 3. The main body 11 of the Bluetooth headset in-car holder/car kit is provided with a charge switch 16 electrically connected to the plug 12. When the charge switch 16 is turned on, power is supplied from the vehicle via the plug 12 to the main body 11 to charge the wireless Bluetooth headset 21 seated in the holding seat 13. And, when the charge switch 16 is turned off, power supply from the vehicle is interrupted. Moreover, the main body 11 of the Bluetooth car kit of the present invention is also provided with at least one light-emitting diode (LED) 17 for indicating current operating state of the main body 11 of the Bluetooth car kit.

In brief, when the wireless Bluetooth headset 21 is seated in the holding seat 13, the Bluetooth headset in-car holder car/kit of the present invention together with the wireless Bluetooth headset 21 forms an in-car Bluetooth handsfree kit for a user to talk on the road without the need of putting on the Bluetooth headset 21. The problem of an uncomfortable ear caused by the Bluetooth headset 21 put thereon for a prolonged time could therefore be overcome.

The present invention has been described with some preferred embodiments thereof and it is understood that many changes and modifications in the described embodiments can be carried out without departing from the scope and the spirit of the invention that is intended to be limited only by the appended claims.

What is claimed is:

1. A Bluetooth headset in-car holder/car kit, comprising:

a main body provided at an end with a pivoted plug for plugging in a cigarette lighter socket on a vehicle to obtain a power supply from said vehicle, and at an opposite end with a holding seat for a wireless Bluetooth headset to seat therein; and said holding seat being provided with at least one connecting port for electrically connecting with said wireless Bluetooth headset seated in said holding seat;

a speaker provided in said main body to electrically connect with said connecting port on said holding seat and, accordingly, said wireless Bluetooth headset seated in said holding seat for outputting sounds received via said wireless Bluetooth headset, enabling said wireless Bluetooth headset and said in-car holder car kit to work together as a Bluetooth handsfree apparatus, via which a user to talk in the car wirelessly; and without putting said wireless Bluetooth headset on one ear; and a microphone provided on said main body to electrically connect with said connecting port and, accordingly, said wireless Bluetooth headset seated in said holding seat for sending a user's voice to a remote caller via said microphone, enabling said wireless Bluetooth headset and said in-car holder car kit to work together as a Bluetooth handsfree apparatus for the user to talk in the car wirelessly.

2. The Bluetooth headset in-car holder/car kit, as claimed in claim 1, wherein said holding seat is adapted to serve as a charging stand to charge said wireless Bluetooth headset seated therein when said pivoted plug is plugged in said cigarette lighter socket on the vehicle; and wherein said main body is provided with a charge switch for controlling power supply from the vehicle via said plug to said main body for charging said wireless Bluetooth headset seated in the said in-car holder car kit seat.

3. The Bluetooth headset in-car holder/car kit as claimed in claim 1, wherein said connecting port is selected from the group consisting of USB connecting ports and other types of electric connecting ports.

4. The Bluetooth headset in-car holder/car kit as claimed in claim 1, wherein said main body has a microphone externally connected thereto, and wherein said microphone and said speaker provided on said main body respectively replace a microphone and a earpiece provided on the said wireless Bluetooth headset seated in said main body, so that sounds received via said wireless Bluetooth headset is output via said speaker on said main body, and a user's voice is sent to a remote caller via said microphone on said main body, enabling said Bluetooth headset in-car holder/car kit with said wireless Bluetooth headset seated therein to form a complete in-car Bluetooth handsfree kit.

* * * * *